United States Patent
Stumpf et al.

(10) Patent No.: US 6,637,095 B2
(45) Date of Patent: Oct. 28, 2003

(54) JOINING ASSEMBLY FOR MOUNTING A FASTENING ELEMENT TO AN EXTERNAL SURFACE OF A STRUCTURAL MEMBER

(75) Inventors: Michael Stumpf, Bielefeld (DE); August Borchard, Lemgo (DE)

(73) Assignee: Böllhoff GmbH, Bielefeld (DE)

( * ) Notice: Subject to any disclaimer, the term of this patent is extended or adjusted under 35 U.S.C. 154(b) by 21 days.

(21) Appl. No.: 09/803,693

(22) Filed: Mar. 9, 2001

(65) Prior Publication Data

US 2001/0024595 A1 Sep. 27, 2001

(30) Foreign Application Priority Data

Mar. 16, 2000 (DE) .......................................... 100 12 781

(51) Int. Cl.⁷ .............................................. B21D 39/00
(52) U.S. Cl. ........................ 29/513; 29/524.1; 156/293; 411/171; 411/166; 403/282; 403/270; 403/242; 403/13; 403/387
(58) Field of Search ................................ 403/270, 282, 403/274, 230, 279, 242, 294, 384, 403, 387, 247, 187, 188, 13, 14; 248/221.11, 211.12, 222.11, 222.12, 56; 439/180; 156/293, 423, 308.2, 308.4, 309.6, 73.5; 174/65 G, 152 G, 153 G, 151, 65 R; 16/2.1, 2.2; 29/509, 513, 524.1; 411/2, 82, 166, 171

(56) References Cited

U.S. PATENT DOCUMENTS

| 2,828,393 | A | * | 3/1958 | Wingard ...................... 29/524.1 |
| 2,958,230 | A | * | 11/1960 | Haroldson .................... 29/509 |
| 3,061,338 | A | * | 10/1962 | Clark .......................... 285/202 |
| 3,378,972 | A | * | 4/1968 | Stanley ...................... 52/309.2 |
| 4,117,261 | A | * | 9/1978 | Blevins et al. .............. 174/164 |
| 4,656,689 | A | * | 4/1987 | Dennis ........................ 16/2.2 |
| 4,675,784 | A | * | 6/1987 | Dahlberg et al. ........... 361/386 |
| 4,768,968 | A | * | 9/1988 | Daggett et al. ............. 439/246 |
| 4,832,549 | A | * | 5/1989 | Shibayama et al. ......... 411/171 |
| 4,833,671 | A | | 5/1989 | Beckner et al. |
| 5,000,607 | A | * | 3/1991 | Parlatore et al. .............. 403/12 |
| 5,579,568 | A | * | 12/1996 | Hudson et al. ................ 29/509 |
| 5,666,988 | A | * | 9/1997 | Becker ........................ 137/15 |
| 5,775,721 | A | * | 7/1998 | Grout ......................... 280/727 |
| 5,913,633 | A | | 6/1999 | Shimizu et al. |
| 6,205,625 | B1 | * | 3/2001 | Kato ........................... 24/297 |
| 6,237,886 | B1 | * | 5/2001 | Katsumata et al. .... 248/225.21 |

FOREIGN PATENT DOCUMENTS

| DE | 7226257 | 4/2000 |
| DE | 9906645 | 8/2000 |

OTHER PUBLICATIONS

Patent Abstracts of Japan, Publ. No. 07279915, Oct. 27, 1995, (19).

* cited by examiner

Primary Examiner—Lynne H. Browne
Assistant Examiner—Michael P. Ferguson
(74) Attorney, Agent, or Firm—Seyfarth Shaw LLP

(57) ABSTRACT

A joining assembly for mounting a fastening element to an external surface of a structural member of deformable material. The structural member is provided at its external surface with one or a plurality of joining projections engaging into respective recesses of a joining flange of said fastening element. The joining projections are provided at their free ends with upset beads obtained by material deformation of the joining projections and positively fixing the associated joining projection to the joining flange.

14 Claims, 1 Drawing Sheet

JOINING ASSEMBLY FOR MOUNTING A FASTENING ELEMENT TO AN EXTERNAL SURFACE OF A STRUCTURAL MEMBER

BACKGROUND OF THE INVENTION

The present invention relates to a joining assembly for mounting a fastening element to an external surface of a structural member of deformable material.

Quite often it is necessary to have structural members of plastics such as plastic housings provided with fixing means enabling to mount other members to said structural members. To this end it has become known for example to press threaded inserts of a harder plastic material into respective openings of the structural members, for example by a hot melt operation, ultrasonic welding or the like. This method, however, cannot be used with thin-walled structural members such as housings of mobile telephones (cellular phones). One possibility would be to provide the structural member with an integral threaded projection by injection moulding. However this is possible only with structural members of very simple geometrical shape.

SUMMARY OF THE INVENTION

It is an object of the invention to provide an improved joining assembly for mounting a fastening element of a material of relatively higher strength to an external surface of a structural member of a material of relatively less strength.

It is a further object of the invention to provide a joining assembly for joining a fastening element and a structural member which allows to mount the fastening element to the separately manufactured structural member in a very simple manner, without the need of any bores or openings in the walls of the structural member.

In the joining assembly of the invention the fastening element comprises a main body provided with functional means and a joining flange integral with said main body, and the structural member is provided with at least one joining projection integral with the external surface thereof and engaging into a respective recess of a joining flange of the fastening element. The joining projection is provided at its free end with an upset bead provided by material deformation of the joining projection and positively retaining the joining projection to the joining flange.

This results in a positively secured surface-to-surface joint between the fastening element and the structural member which is of high resistance to twisting, withdrawal and shear stresses. Since it is not necessary to provide any bores or openings in the walls of the structural member, the walls of the structural member can be made of extremely small thickness.

The structural member is preferably made of thermoplastic material, but could be made also of light metal. In any case the structural member must be made of a material which can be deformed for making the upset bead at the end of the joining projection.

When the structural member is made of thermoplastic material, the upset bead can be made by a conventional hot melt operation such as ultrasonic welding, linear or rotation friction welding or another hot melt operation. When, however, the structural member is made of light metal, the upset bead is advantageously made by cold deformation (e.g. a riveting operation).

BRIEF DESCRIPTION OF THE DRAWINGS

For the purpose of facilitating an understanding of the invention, there is illustrated in the accompanying drawing a preferred embodiment thereof, from an inspection of which, when considered in connection with the following description, the invention, its construction and many of its advantages should be readily understood and appreciated.

DESCRIPTION OF THE PREFERRED EMBODIMENT

Figure 1:
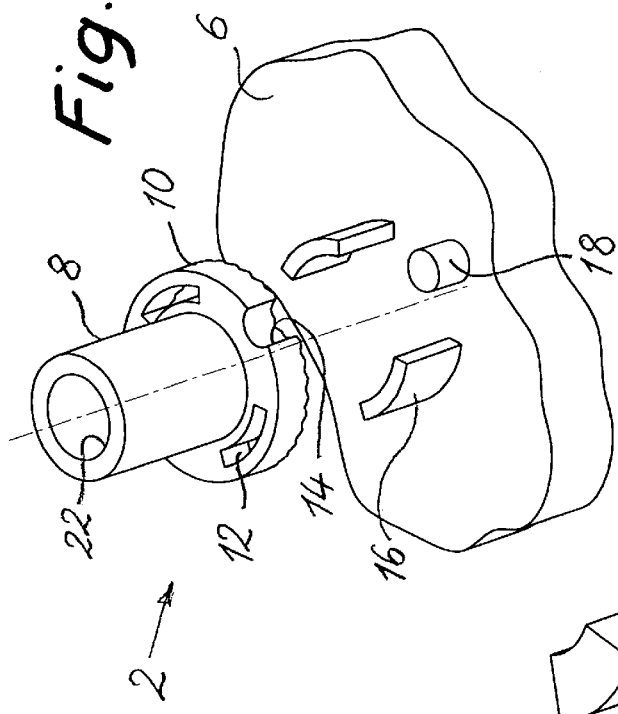
FIG. 1 is a perspective view of a fastening element and a structural member prior to a joining operation.

A fastening element 2 shown in FIG. 1 is to be mounted to planar external surface 6 of a structural member 4. The structural member 4 is a thin-walled member such as a housing of a mobile telephone (cellular phone).

The structural member 4 is made of a material of a relatively small strength such as thermoplastic material or light metal. The fastening element 2 is made of a material of greater strength, in particular metal or a harder plastic material. Therefore the fastening element 2 can perform a fastening function for the structural member 4 when the fastening element 2 has been integrally and rigidly connected to the structural member 4.

The fastening element 2 comprises a main body 8 and a joining flange 10 integral with the main body 8 and provided with three recesses 12, 14 in the embodiment as shown. The external surface 6 of the structural member 4 has integral projections 16 and 18 matingly shaped with respect to the recesses 12 and, respectively, 14.

The joining flange 10 is a thin annular flange which, in the embodiment as shown, is of circular shape; however, it could also be of another shape. As shown in the drawing, the recesses 12 are shaped as annular wall segments extending through the joining flange 10 while the recess 14 is a groove of generally semi-circular cross-section at the outer periphery of the joining flange 10. The projections 16 and 18 at the external surface 6 of the structural member 4 are adapted to the recesses 12 and, respectively, 14 as to their cross-sectional shapes and relative positions, i.e. the projections 16 are shaped as annular wall segments, and the projection 18 is of cylindrical shape.

Figure 3:
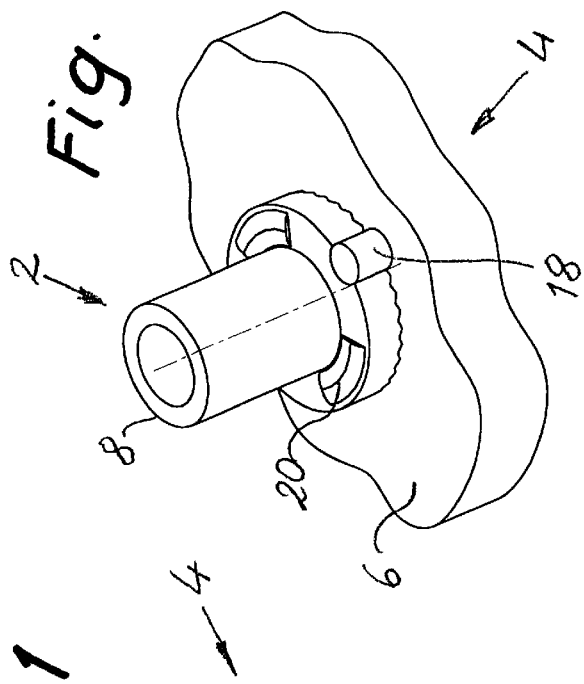
FIG. 3 is a view similar to FIGS. 1 and 2 after the joining operation.
Figure 2:
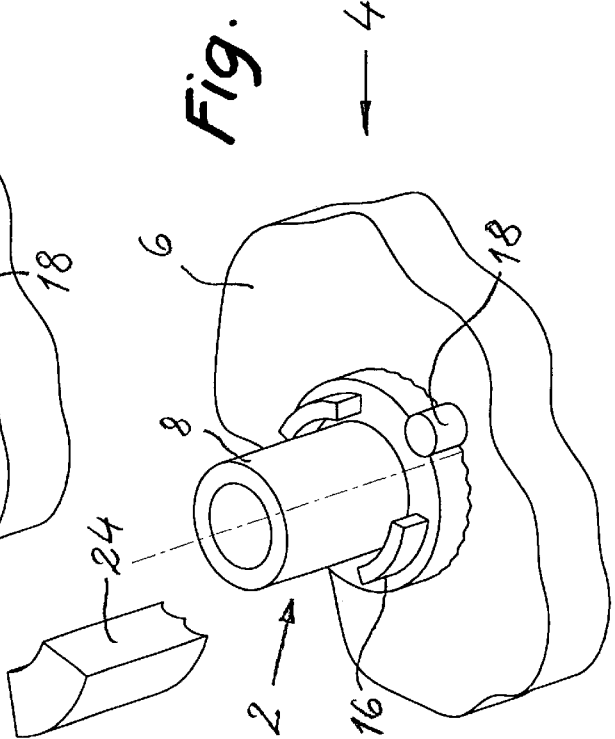
FIG. 2 is a view similar to FIG. 1 during an intermediate step of the joining operation.

The length of the projections 16 is greater than the thickness of the joining flange 10 so that the projections 16 extend beyond the upper surface of the joining flange 10 for a predetermined amount when the structural member 2 has been positioned so as to be engaged by the projections 16 and 18 (see FIG. 2). The free ends of the projections 16 will be deformed by upsetting so as to provide upset beads 20 (see FIG. 3) which positively retain the fastening element 2 to the structural member 4 as will be explained in more detail below.

The cylindrical projection 18, which is not absolutely necessary and could be dispensed with, is of a length corresponding to the thickness of the joining flange 20 so that it does not extend beyond the upper surface of the joining flange 20 and will not be provided with an upsetting bead. Its function is to increase the joining assembly's resistance to relative rotational movements.

It should be understood that the number, shape and position of the recesses 12, 14 and the projections 16, 18 can be selected to be different from those in the shown embodiment. The annular segmental shape of the recesses 12 and projections 16 provides for substantial shear resistance at minimal space. Depending on the particular application other geometrical shapes may be appropriate. As shown the walls of the recesses 2 and projections 16 extend perpendicularly to the external surface 6 of the structural member 4. However, it would be possible to provide for small tapers of the recesses 12 in order to facilitate insertion of the projections into the structural member 2. As an alternative the recesses 12 could be tapered in the opposite direction so that there will be additional space for receiving material when material is deformed for making the upsetting beads 20. This would increase the joining assembly's resistance to withdrawal. Preferably the projections 16 should be dimensioned somewhat smaller than the recesses 12 in order to facilitate insertion of the projections 16 into the structural member 2.

Of course the projection 18 which could be dispensed with may also be of a shape different from the shape as shown. For example it could be of angular, profiled or toothed shape. Furthermore, the projection 18, similar to projections 16, could be of an axial length sufficient to provide for an upsetting bead 20 so that it would also assist in axially securing the fastening element 2.

The main body 8 of the fastening element 2 which is a hollow cylinder in the embodiment as shown is provided with functional means 22. In the embodiment shown the functional means 22 are comprised of a smooth bore; alternatively they could be comprised of a tapped bore, a portion of a closure or snapping means, a smooth or threaded bolt or similar fastening means.

As may be seen from the figures, the bottom surface of the joining flange 10 may be ribbed or fluted in order to increase the resistance to relative rotational movements between the fastening element 2 and the structural member 4.

The joining assembly comprising the fastening element 2 and the structural member 4 will be manufactured as follows:

Initially the fastening element 2 and the structural member 4 are manufactured separately from each other, for example by injection moulding or in any other suitable manner.

Thereafter the fastening element 2 is positioned upon the external surface 6 of the structural member 4 such that the projections 16 and 18 are received from the recesses 12 and, respectively, 14 as shown in FIG. 2. The dimensions of the respective components may be selected such that e.g. the projections 16 are received in the recesses 12 with play while the projection 18 is received in the recess 14 by a press-fit. This allows precisely to position the fastening element 2 relative to the structural member 4 if required.

Thereafter the projecting free ends of the projections 12 are deformed into upsetting beads 20 by plastifying and deforming the material by means of a welding tool 24 (schematically indicated in FIG. 2)—similar to a riveting or grimping operation—to provide for a positive joint between the fastening element 2 and the structural member 4. The dimensions and shape of the upsetting beads 20 will be chosen in dependence of the specific application.

When the structural member 4 is made of light metal, the projections 16 and 18 are preferably formed as hollow rivets so that the upsetting beads 20 can be made by a conventional riveting operation (cold deformation).

We claim:

1. A method of making a joining assembly, comprising the following steps:

providing a fastening element having a main body with functional means and a joining flange which is integral with said main body, has upper and lower faces and is provided with at least one recess, providing a structural member of a deformable material, which is a thin-walled housing of a mobile telephone having a continuous planar external surface and at least one joining projection extending from said external surface, said at least one joining projection being in the shape of an annular wall segment and said at least one recess being a through-opening matingly shaped with respect to said annular wall segment, positioning said fastening element upon said external surface of said structural member such that said at least one joining projection is received in said at least one recess, with said at least one joining projection having a free end projecting from and above said upper face of said joining flange, and deforming said free end of said at least one projection into an upset bead so as to positively connect said at least one projection to said joining flange.

2. The method of claim 1 wherein said fastening element is made of thermoplastic material or light metal.

3. The method of claim 1 wherein said structural member is made of thermoplastic material or light metal.

4. The method of claim 1 wherein said deforming step comprises cold deformation or hot melt deformation.

5. The method of claim 4 wherein said cold deformation comprises a riveting or crimping operation.

6. The method of claim 1 wherein said joining flange is a thin-walled annular flange.

7. The method of claim 1 wherein there is at least one further joining projection in the shape of a cylinder.

8. The method of claim 1 wherein said at least one joining projection and said at least one recess extend substantially perpendicularly to said external surface of said structural member.

9. The method of claim 1 wherein said at least one recess is of slightly tapering shape to facilitate insertion of said at least one joining projection into said at least one recess.

10. The method of claim 1 wherein said at least one recess is of slightly tapering shape to receive material as a result of said deformating step.

11. The method of claim 1 wherein said functional means of said fastening element comprises a smooth or threaded bore, closure means or snapping means or other fastening means.

12. A method of making a joining assembly, comprising the following steps:

providing a fastening element having a main body with functional means and a joining flange which is integral with said main body, has upper and lower faces and is provided with at least one recess, providing a structural member of a deformable material, which is a thin-walled housing of mobile telephone having a continuous planar external surface and at least one joining projection extending from said external surface, said at least one joining projection being in the shape of an annular wall segment and said at least one recess being a through-opening matingly shaped with respect to said annular wall segment, wherein there is at least one further recess in the shape of a groove provided at an external peripheral surface of said flange, positioning said fastening element upon said external surface of said structural member such that said at least one joining projection is received in said at least one recess, with said at least one joining projection having a free end projecting from and above said upper face of said joining flange, and deforming said free end of said at least one projection into an upset bead so as to positively connect said at least one projection to said joining flange.

13. The method of claim 12 wherein there are provided a plurality of joining projections and a similar plurality of recesses of which at least one is formed as said through-opening and at least one is formed as said groove.

14. The method of claim 13 wherein one or several of said plurality of joining projections are of a length corresponding to the thickness of said joining flange and formed without upset beads.

* * * * *